(12) United States Patent
Kataumi et al.

(10) Patent No.: US 6,378,394 B2
(45) Date of Patent: Apr. 30, 2002

(54) OPERATING APPARATUS FOR AUTOMATIC TRANSMISSION

(75) Inventors: Yoshimasa Kataumi; Takao Murakami; Takayoshi Suzuki; Hirokazu Hirabayashi, all of Kosai (JP)

(73) Assignee: Fujikiko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/901,541

(22) Filed: Jul. 9, 2001

Related U.S. Application Data

(62) Division of application No. 08/982,904, filed on Dec. 2, 1997, now Pat. No. 6,282,974.

(30) Foreign Application Priority Data

Mar. 12, 1996 (JP) .............................. 8-322978
Mar. 12, 1996 (JP) .............................. 8-322981

(51) Int. Cl.$^7$ ............................ B60K 20/00; G05G 5/00
(52) U.S. Cl. ..................................... 74/473.3; 74/473.28
(58) Field of Search ..................... 74/473.28, 473.23, 74/473.3, 501.6, 483 R, 538

(56) References Cited

U.S. PATENT DOCUMENTS

| | | | | |
|---|---|---|---|---|
| 4,365,522 A | * | 12/1982 | Kubota et al. ............. | 74/527 X |
| 4,532,824 A | * | 8/1985 | Lamy et al. ............. | 74/473.23 |
| 4,649,766 A | * | 3/1987 | Kiekhaefer ............. | 74/473.15 |
| 4,934,496 A | * | 6/1990 | Barske et al. ............. | 74/483 X |
| 5,150,593 A | * | 9/1992 | Kobayashi et al. ....... | 74/538 X |
| 5,934,146 A | * | 8/1999 | Richard .................... | 74/473.33 |

FOREIGN PATENT DOCUMENTS

| | | | |
|---|---|---|---|
| JP | 262956 | * | 9/1994 |
| JP | 157482 | * | 6/1998 |
| JP | 71802 | * | 3/2000 |

\* cited by examiner

*Primary Examiner*—David A. Bucci
*Assistant Examiner*—Marcus Charles
(74) *Attorney, Agent, or Firm*—Thomas, Kayden, Horstemeyer & Risley

(57) ABSTRACT

An operating apparatus for an automatic transmission, comprises: a select lever connected to automatic transmission end; a first rotation supporting point provided at a middle position of the select lever and supporting the select lever in such a manner as to freely rotate; a second rotation supporting point provided at a position apart from the first rotation supporting point in the select lever at a predetermined distance; an operating lever rotatably connected to the select lever through the second rotation supporting point; a positioned member provided at a predetermined position in the operating lever; and a positioning member for determining a position of the positioned member to a predetermined position.

6 Claims, 17 Drawing Sheets

OPERATING APPARATUS FOR AUTOMATIC TRANSMISSION

CROSS-REFERENCE TO RELATED APPLICATION

This application is a divisional of U.S. utility application entitled, "Operating Apparatus for Automatic Transmission," having Ser. No. 08/982,904, filed Dec. 2, 1997, now U.S. Pat. No. 6,282,974 which is entirely incorporated herein by reference.

BACKGROUND OF THE INVENTION

1. Field of the Invention

The present invention relates to an operating apparatus for an automatic transmission capable of selecting a predetermined position such as a parking position and a drive position and the like by moving an operating lever.

2. Description of the Related Art

An operating apparatus for an automatic transmission of this kind is structured such that, for example, in the case that the operating apparatus is mounted on an automotive vehicle, a select lever and an operating lever are integrally rotated around a pin and the pin extends between two detent plates disposed in parallel. A detent gate is formed in the detent plate and a detent having unevenness is formed on this detent gate.

The operating lever has a compression rod within a pipe, and a position pin is provided in a front end of the compression rod. The position pin is structured such that a front end portion thereof is inserted into the detent gate so as to be brought into contact with the detent. A knob button for pressing the compression rod downward and a return spring for returning the knob button to an original position are provided in a head portion of the operating lever. On the contrary, a position spring for ascending the compression rod upward and pressing the position pin to the detent is provided within the pipe.

Then, the compression rod, the position pin, the knob button, the return spring and the position spring mentioned above constitute a locking member R for inhibiting a movement of the operating lever and removing the inhibition.

In the operating apparatus for the automatic transmission structured in the above manner, the operating lever can be moved to each of positions from a parking position P1 to a first position P6 by rotating the operating lever around the pin. However, in the case of moving from the parking position P1 to a reverse position P2 and vice versa, the case of moving from a neutral position P3 to the reverse position P2 and the case of moving from a second position P5 to the first position P6, the operating lever can be moved only by pushing the knob button and moving the position pin downward.

Accordingly, in each of the above operations, the operating lever can be moved only after the inhibition of moving the operating lever is removed by the knob button. However, the operation between the neutral position P3, a drive position P4 and the second position P5 can be freely performed by moving the operating lever without pushing the knob button.

However, in the operating apparatus for the automatic transmission in accordance with the related art, since the operating lever is structured such as to rotate around the pin, the head portion of the operating lever can only move in an arch like manner around the pin.

Further, since the detent on the detent plate is formed as an arch like around the pin and the position pin is structured such as to move in an axial direction of the operating lever, an layout of the operating lever, the position pin and the detent gate is limited. Accordingly, in the case that the operating lever is disposed in such a manner as to project from a vertical wall surface of an instrument panel of the automotive vehicle, the operating lever is operated in a vertical direction, so that the operating performance is deteriorated. In order to solve this problem, it is considered that the operating lever is bent, however, this makes the structure for moving the position pin complex, so that there are problems such as an increase of a number of parts and an increase of a cost or the like.

Further, in the operating apparatus for the automatic transmission mentioned above, since the detent is provided on the side in which the operating lever extends with respect to the pin, the detent plate projects from the mounting surface so that the panels (not shown) covering the detent plate project. Accordingly, the operating lever or the panels obstruct the way when the driver moves to the assistant driver's seat or the rear seat. In this case, when the projection is lowered by providing the rotating center of the operating lever at a position lower than the mounting surface, there is a problem that the operating lever becomes long, so that the operating stroke of the operating lever becomes long.

SUMMARY OF THE INVENTION

The present invention has been achieved with such points in mind.

It therefore is an object of the present invention to provide an operating apparatus for an automatic transmission capable of moving an operating lever in such a manner as to generate various kinds of locus and improving a freedom of layout.

Another object of the present invention is to provide an operating apparatus for an automatic transmission capable of shortening an operating stroke of the operating lever and making a mounting space compact.

To achieve the object, according to a first aspect of the present invention, there is provided an operating apparatus for an automatic transmission, comprising: a select lever connected to the automatic transmission end; a first rotation supporting point provided at a middle position of the select lever and supporting the select lever in such a manner as to freely rotate; a second rotation supporting point provided at a position apart from the first rotation supporting point in the select lever at a predetermined distance: an operating lever rotatably connected to the select lever through the second rotation supporting point; a positioned member provided at a predetermined position in the operating lever; and a positioning member for determining a position of the positioned member to a predetermined position.

In accordance with the invention as recited in the first aspect structured in the above manner. the position of the operating lever and the extending direction thereof are determined by two positions of the second rotation supporting point and the positioned member. In this case, since the second rotation supporting point is determined such as to move in such a manner as to always generate an arch like locus around the first rotation supporting point, the locus on which the operating lever moves is also determined by determining the moving position of the positioned member by means of the positioning member.

For example, in the case that the second rotation supporting point moves on the locus of moving downward in an arch like manner from a top position, when an end portion of the operating lever is inclined such as to be ascended upward at a distance corresponding to the descending distance, at least the one end portion of the operating lever generates a horizontal moving locus. Accordingly, the inclination of the operating lever can be set by the positioning member and the positioned member. Therefore, the operating lever can be moved such as to generate various kinds of locus.

According to a second aspect of the present invention, as it depends from the first aspect, the positioning member is constituted by a detent gate formed in a detent plate supporting the select lever through the first rotation supporting point; the positioned member is constituted by a projecting member inserted into the detent gate; and the operating lever is rotated around the second rotation supporting point by a biasing member to engage the projecting member with a detent having unevenness formed on the detent gate.

In accordance with the invention as recited in the second aspect, the projecting member is fitted into the recess portion of the detent, thereby inhibiting movement of the operating lever. In this state, when the operating lever is rotated around the second rotation supporting point and the projecting member is drawn out from the recess portion of the detent, the operating lever becomes movable. Accordingly, inhibition of moving the operating lever and removal of the inhibition can be performed without using the conventional knob button, return spring and compression rod. Therefore, reduction of a number of the parts, simplification of the structure and cost reduction thereby can be achieved.

According to a third aspect of the present invention, as it depends from the first or the second aspect, the operating apparatus is disposed in front of a driver's seat thereby a driver is able to move between the driver's seat and an assistant driver's seat or a rear seat.

In accordance with the invention as recited in the third aspect, since the operating apparatus is disposed in front of the driver's seat so that the driver, an occupant or an attendant is able to move between the driver's seat and the assistant driver's seat or the rear seat, the operating apparatus can freely move between the driver's seat and the assistant driver's seat, or between the driver's seat and the rear seat. Further, the operating apparatus can be disposed in every places, for example, in the upper portion of the instrument panel from the floor portion in front of the driver's seat. Then, at this time, since the moving locus of the operating lever can be set to various directions, the operating performance can be improved and interference with the peripheral parts can be easily avoided. Particularly, the operating performance can be improved by constructing the operating lever in such a manner as to horizontally move in a longitudinal direction.

According to a fourth aspect of the present invention, as it depends from the first, the second or the third aspect, the operating apparatus is disposed in a front panel of the driver's seat.

In accordance with the invention as recited in the fourth aspect, since the operating apparatus is provided in the panel in front of the driver's seat, the operating apparatus can freely move between the driver's seat and the assistant driver's seat, or between the driver's seat and the rear seat. Further, the total structure can be housed within the front panel and it is structured such that only the operating lever is exposed. At this time, since the moving locus of the operating lever can be set to various directions, the operating performance can be improved and interference of the operating lever with the peripheral parts such as a steering wheel can be easily avoided. Still further, since the operating lever is structured such as to horizontally move in the longitudinal direction, the operating performance can be improved.

According to a fifth aspect of the present invention, there is provided an operating apparatus for an automatic transmission, comprising: a select lever connected to the automatic transmission end; a first rotation supporting point provided at a middle position of the select lever and supporting the select lever in such a manner as to freely rotate; an operating lever connected to the select lever in a substantially perpendicular manner at a position apart from the first rotation supporting point in the select lever at a predetermined distance; a position pin provided at a predetermined position in the operating lever and arranged in such a manner as to freely swing around an axis of the operating lever; and a positioning member for determining the position of the operating lever to a predetermined position by engaging with the position pin.

In accordance with the invention as recited in the fifth aspect, since the operating lever is connected to the select lever in such a manner as to extend in a substantially perpendicular direction and the position pin is provided in such a manner as to freely swing or rotate around the axis of the operating lever, a freedom of layout for the operating lever, the position pin and the detent gate becomes great. Further, since the structure is made such that an engagement and detachment of the positioning member is performed by rotating the position pin with respect to the axis of the operating lever, the structure can be simplified and the number of the parts can be reduced. Accordingly, even in the case that the operating lever is disposed in such a manner as to project from the vertical wall surface of the instrument panel of the automotive vehicle, the operating structure of the position pin can be simplified and the cost thereof can be reduced.

According to a sixth aspect of the present invention, there is provided an operating apparatus for an automatic transmission, comprising: a detent plate having a detent formed as an uneven shape; a rotation supporting point provided on the detent plate; a select lever provided on the detent plate in such a manner as to freely rotate through the rotation supporting point and connected to the automatic transmission end; an operating lever connected to the select lever and rotating around the rotation supporting point together with the select lever; and a locking member provided on the operating lever and for inhibiting a motion of the operating lever and removing the inhibition by engaging with the recess portion of the detent or removing from the recess portion, wherein the detent is provided at a position of the detent plate opposite to the operating lever with respect to the rotation supporting point.

In accordance with the invention as recited in the sixth aspect structured in the above manner, since the detent is provided in the opposite side to the operating lever with respect to the rotation supporting point, the operating lever can be made short. Accordingly, the operating stroke of the operating lever can be shortened. Further, since the detent plate does not project to the operating lever end, the narrow mounting space is sufficient. Accordingly, the mounting space can be made compact. Therefore, when the driver moves to the assistant driver's seat or the rear seat, the operating apparatus for the automatic transmission does not interfere the way, so that it is effective in view of employing a walk-in-through mechanism.

According to a seventh aspect of the present invention, as it depends from the sixth aspect, the operating lever is provided at a position which is shifted at a predetermined distance with respect to a rotating center of the rotation supporting point.

In accordance with the invention as recited in the seventh aspect, since the operating lever is provided in a position shifted at a predetermined distance with respect to the rotating center of the rotation supporting point, the locking member for going into or out of the recess portion of the detent can be easily provided along the operating lever.

According to a eighth aspect of the present invention, there is provided an operating apparatus for an automatic transmission, comprising: an indicator plate moving together with an operating lever; and an indicator for displaying a position of the operating lever along a moving line of the indicator plate in accordance with a position of the indicator plate.

In accordance with the invention as recited in the eighth aspect, since the indicator plate moving together with the operating lever is provided and the indicator for displaying the position of the operating lever along the moving line of the indicator plate in accordance with the position of the indicator plate is provided, the position of the operating lever can be displayed by using the vacant space. Further, the indicator can be disposed at a position which the driver easily recognizes.

BRIEF DESCRIPTION OF THE ACCOMPAYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
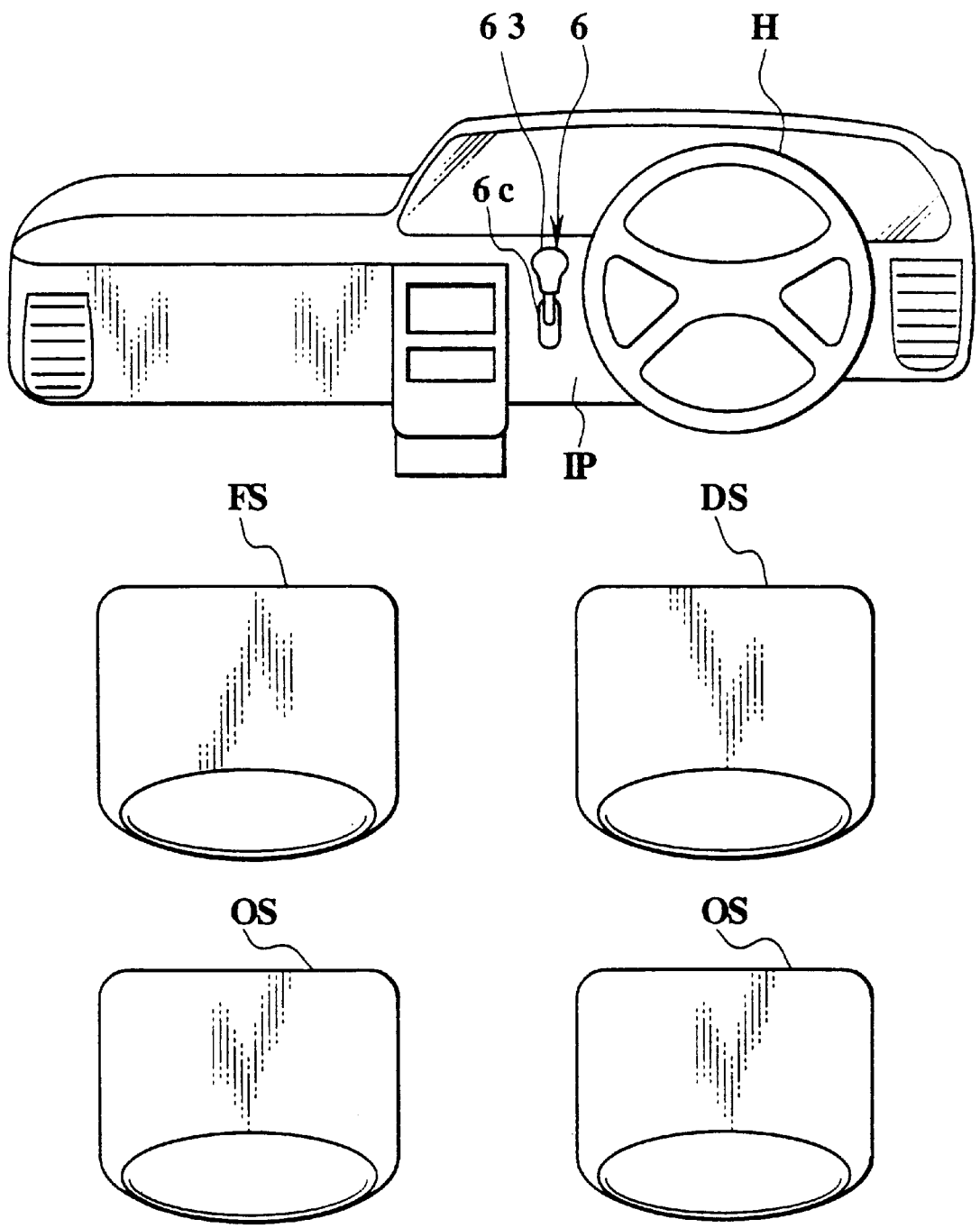
FIG. 1 is a schematic drawing which shows a setting position of an operating apparatus for an automatic transmission in accordance with the present invention.

There will be detailed below the preferred embodiments of the present invention with reference to the accompanying drawings. Like members are designated by like reference characters.

At first, a first embodiment in accordance with the present invention will be explained below with reference to FIGS. 1 to 6.

An operating apparatus for an automatic transmission in accordance with the present invention is housed within an instrument panel IP serving as a panel disposed in front of a driver's seat DS of an automotive vehicle, as shown in FIG. 1. At least an operating portion 6c and an operating knob 63 in an operating lever 6 are positioned in a side portion of a steering wheel H in a state of projecting toward the driver's seat DS from the instrument panel IP.

Figure 2:
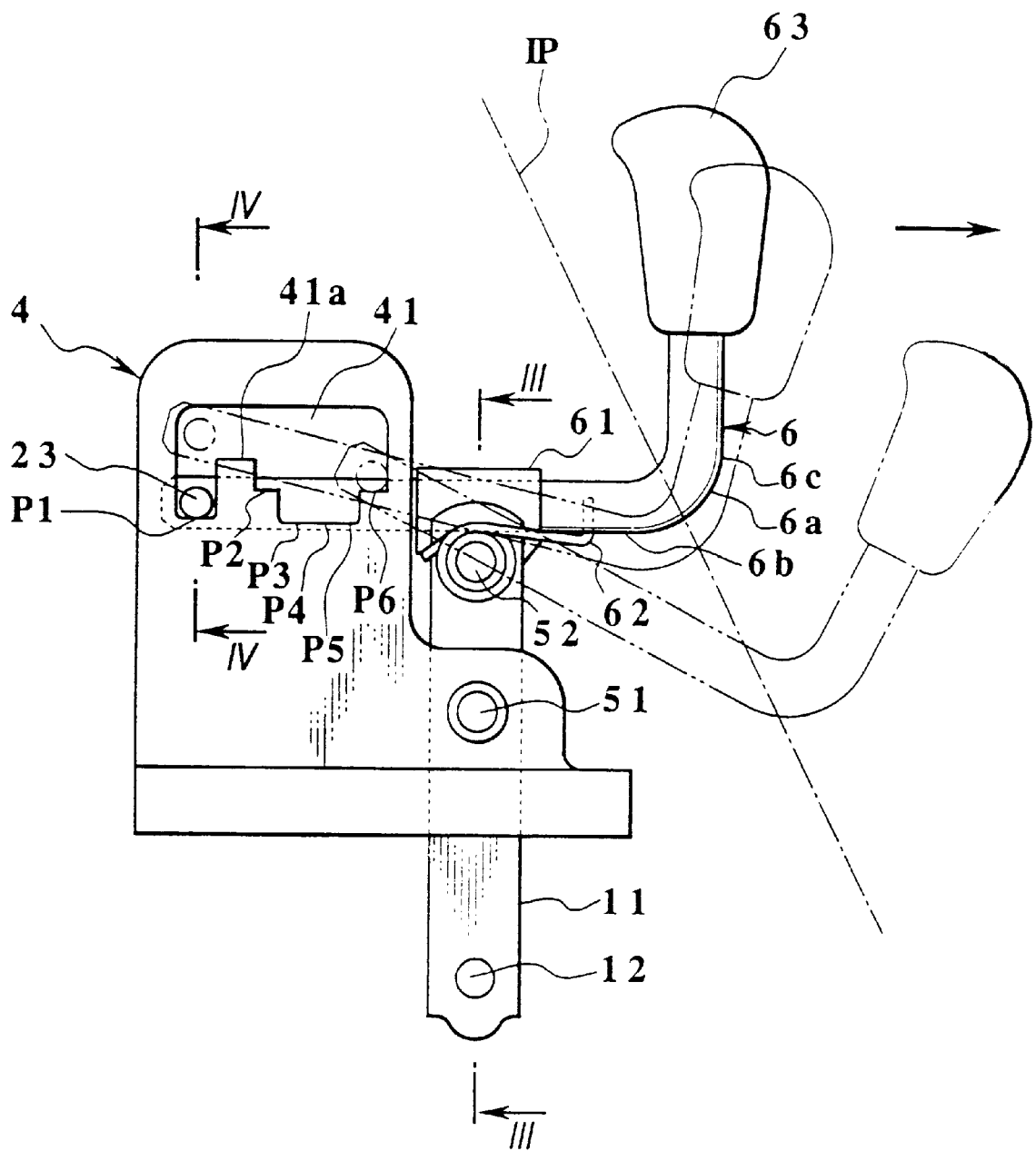
FIG. 2 is a side elevational view which shows an operating apparatus for an automatic transmission in accordance with a first embodiment of the present invention.
Figure 3:
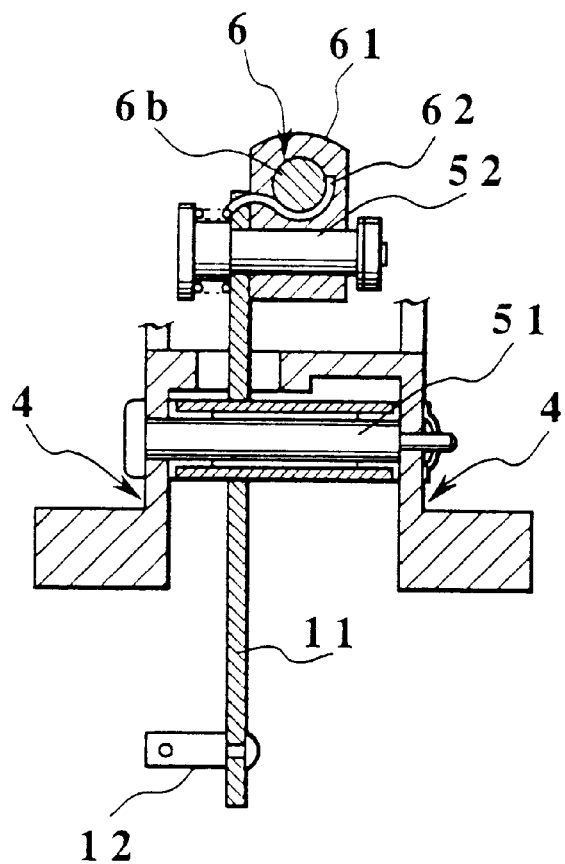
FIG. 3 is a cross sectional view along a line III—III in FIG. 2 which shows the operating apparatus of the automatic transmission.
Figure 4:
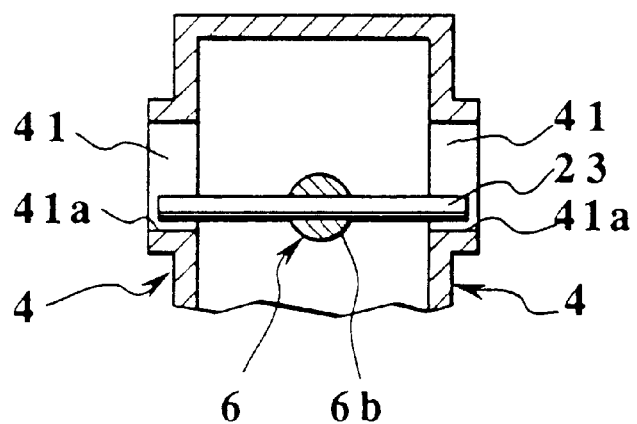
FIG. 4 is a cross sectional view along a line IV—IV in FIG. 2 which shows the operating apparatus of the automatic transmission.

The operating apparatus for the automatic transmission according to this embodiment comprises, as shown in FIGS. 2 to 4, a select lever 11 connected to the automatic transmission (not shown), a first pin (a first rotation supporting point) 51 provided in a middle position of the select lever 11 in a longitudinal direction and rotatably supporting the select lever 11, a second pin (a second rotation supporting point) 52 provided in a position apart from the first pin 51 in the select lever 11 at a predetermined distance, the operating lever 6 connected to the select lever 11 through the second pin 52 in such a manner as to freely rotate, a position pin (a positioned member, or a projecting member) 23 provided in a front end portion of the operating lever 6, and a detent (a positioning member) 41a for determining the position of the position pin 23 to a predetermined position.

The select lever 11 is provided with the second pin 52 mentioned above at one end portion thereof and is provided with a pin 12 for connecting a connecting member 12a which is connected to the automatic transmission (not shown) at the other end portion thereof. The first pin 51 is extended between two detent plates 4 which are disposed in parallel.

The operating lever 6 is formed by bending a round rod at a predetermined position, and is constituted by a bent portion 6a, a working portion 6b disposed in one side and the operating portion 6c disposed in the other side. The position pin 23 mentioned above is securely fixed to the front end portion of the working portion 6b by press-fitting or welding or the like. Further, a middle portion of the working portion 6b is connected to the second pin 52 through a bearing member 61. The bearing member 61 is rotatably connected to the second pin 52, and is structured such as to fixedly hold the working portion 6b. Then, the working portion 6b is energized to rotate in a counterclockwise direction in FIG. 1 by a torsion spring (an energizing member) 62 so as to bring the position pin 23 into contact with the detent 41a. On the contrary, the operating knob 63 is provided in a front end portion (a head portion) of the operating portion 6c. In this case, a rotating direction of the select lever 11 around the first pin 51 and a rotating direction of the operating lever 6 around the second pin 52 are set to the same direction.

Then, in the above operating apparatus for the automatic transmission, the position and the extending direction of the operating lever 6 are determined by two positions of the second pin 52 and the position pin 23. However, since the second pin 52 among the first and the second pins 51 and 52 is set to move in such a manner as to always generate an arch like locus around the first pin 51, when the position of the position pin 23 is determined by a detent gate 41, the locus which the operating lever 6 moves is determined.

Figure 5:
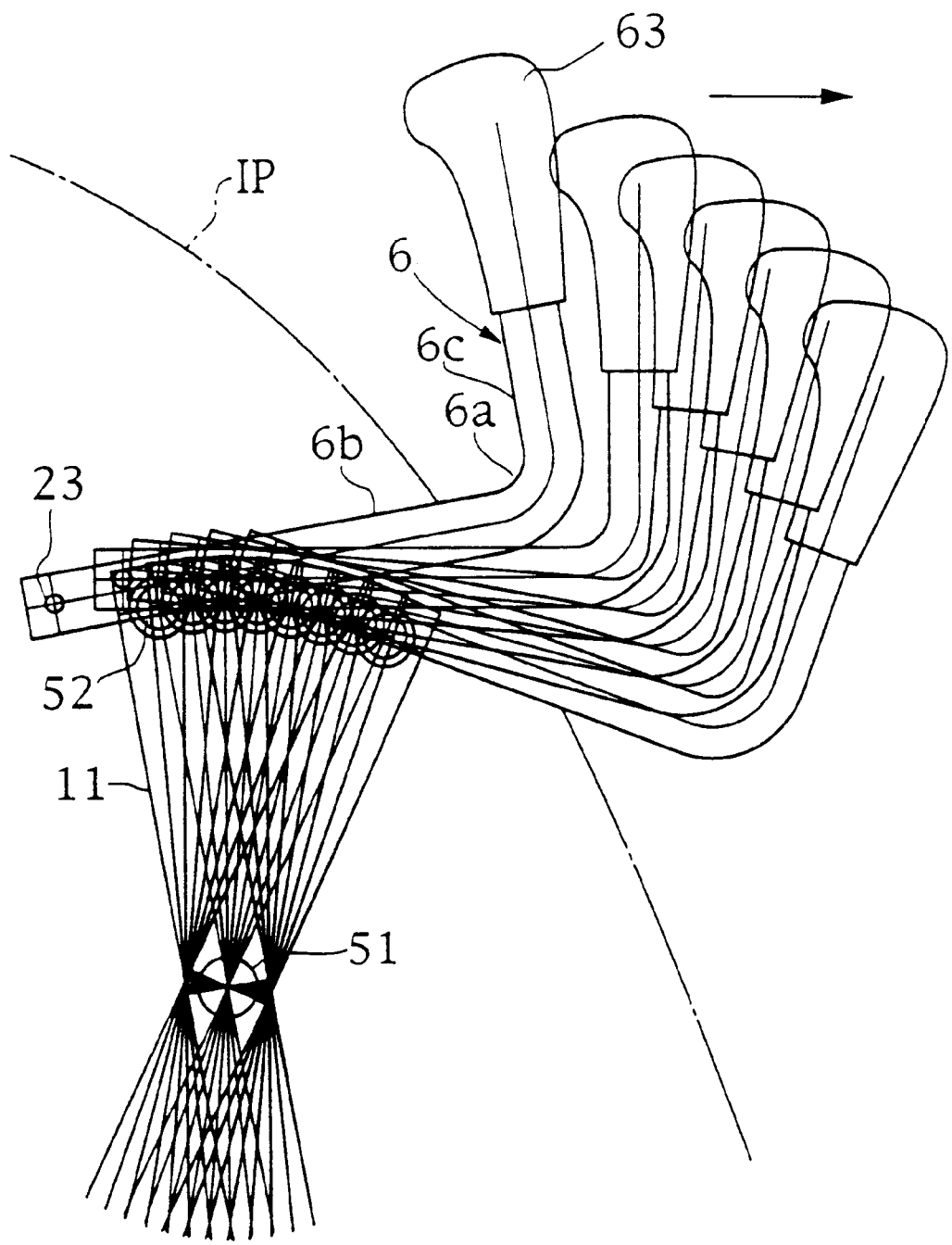
FIG. 5 is a schematic view which shows a function of the operating apparatus for the automatic transmission.

For example, in the case shown in FIG. 2, by moving the lever 6 to the side of a driver's seat, the second pin 52 moves along a locus going downward in an arch like from a top position thereof. FIG. 5 shows a locus generated by the position pin 23 which is moved along a path of an arch like around the first pin 51. In an actual operation, since the upper surface of the detent 41a of the detent gate 41 is formed to be horizontal in spite that the detent 41a of the detent gate 41 has the unevenness, the operating knob 63 gradually moves downward from the locus shown in FIG. 5 by moving the operating lever 6 to the driver's seat DS end. Further, when the operator let go the hand of the operating knob 63 of the operating lever 6 after moving the operating knob, the operating lever 6 rotates until the position pin 23 is brought into contact with the detent 41a, and the operating knob 63 moves upward.

Figure 6:
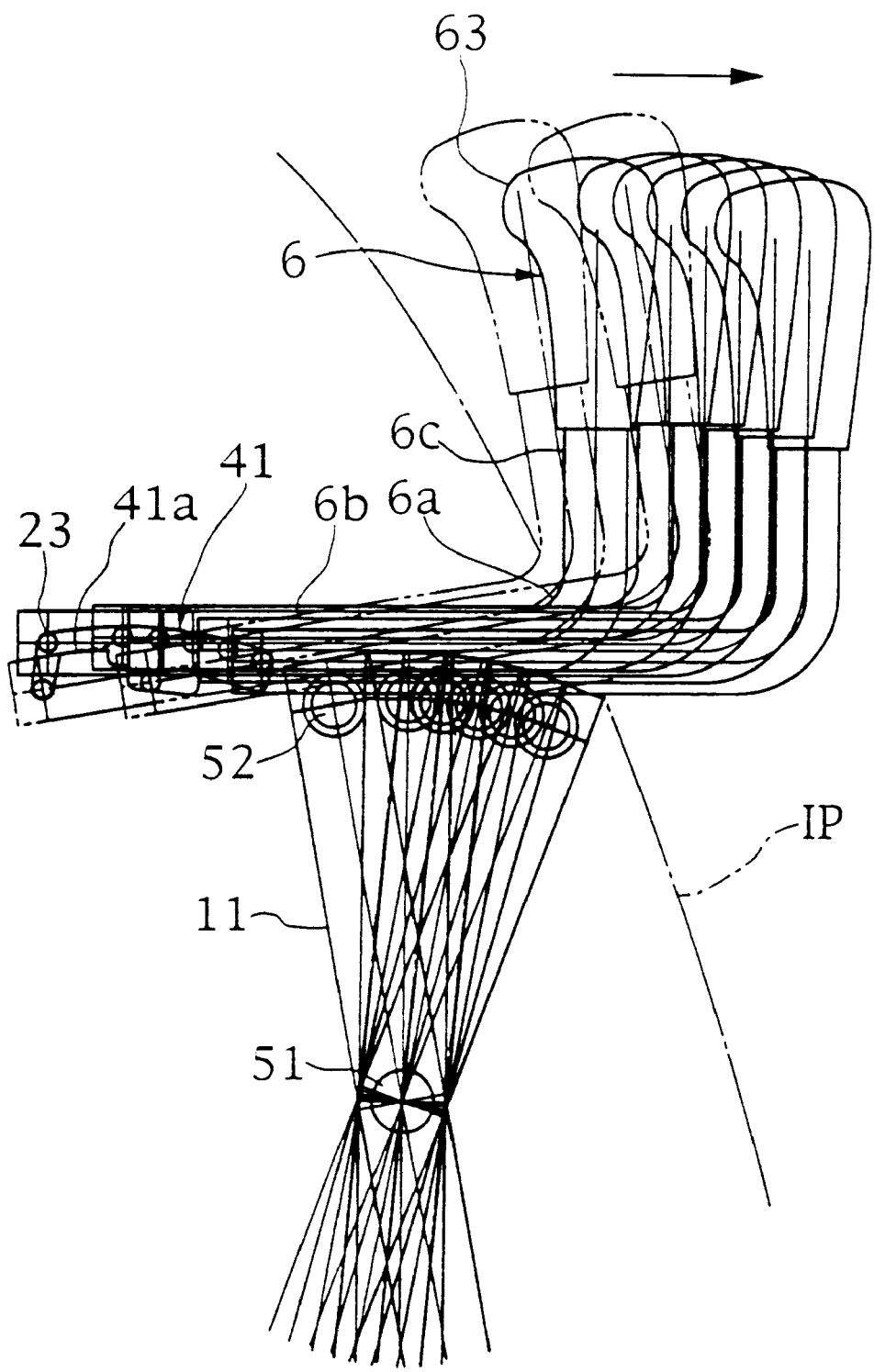
FIG. 6 is a schematic view which shows a function of the operating apparatus for the automatic transmission.

However, as shown in FIG. 6, when the detent gate 41 is formed such as to gradually go down in accordance with going toward the driver's seat DS, the operating lever 6 is inclined in such a manner that the operating knob 63 end is ascended as the operating lever 6 moves downward together with the second pin 52. Accordingly, the operating knob 63 can move in a substantially horizontal direction.

As mentioned above, when the operating lever 6 is inclined in such a manner that the operating knob 63 is ascended at a degree corresponding to a distance moving downward together with the second pin 52, at least the operating knob 63 generates a moving locus in the horizontal direction. Further, since the inclination of the operating lever 6 can be freely set by the detent gate 41, the operating lever 6 can be moved in such a manner as to generate various kinds of locus.

Further, when the position pin 23 is, for example, in the parking position P1, the operating lever 6 can not be moved to the reverse position P2. In this case, when the operating lever 6 is rotated around the second pin 52, thereby drawing out the position pin 23 from the recess portion of the detent 41a, the operating lever can be moved to the reverse position P2. Accordingly, the inhibition of moving the operating lever 6 and the removal of the inhibition can be performed without using the conventional knob button 25 return spring 26 and compression rod 27 shown in FIGS. 15 to 16. Therefore, reduction of the number of the parts, simplification of the structure and cost reduction thereby can be achieved.

Still further, since the above operating apparatus for the automatic transmission is provided in the panel in front of the driver's seat DS, that is, the instrument panel IP, the operating apparatus can freely move between the driver's seat DS (refer to FIG. 1) and the assistant driver's seat FS, or the driver's seat DS and the rear seat OS. The total structure of the operating apparatus for the automatic transmission is housed within the instrument panel IP and at least the operating portion 6c and the operating knob 63 in the operating lever 6 are exposed from the instrument panel IP, however, since the moving locus of the operating lever 6 can be set to various directions, the operating performance can be improved and the interference of the operating knob 63 against the peripheral parts, for example, the steering wheel H can be easily avoided. The operating performance can be particularly improved by structuring the operating knob 63 in such manner as to horizontally move in the longitudinal direction. Accordingly, the operating apparatus for the automatic transmission which is particularly suitable for providing in the instrument panel IP can be obtained.

Figure 7:
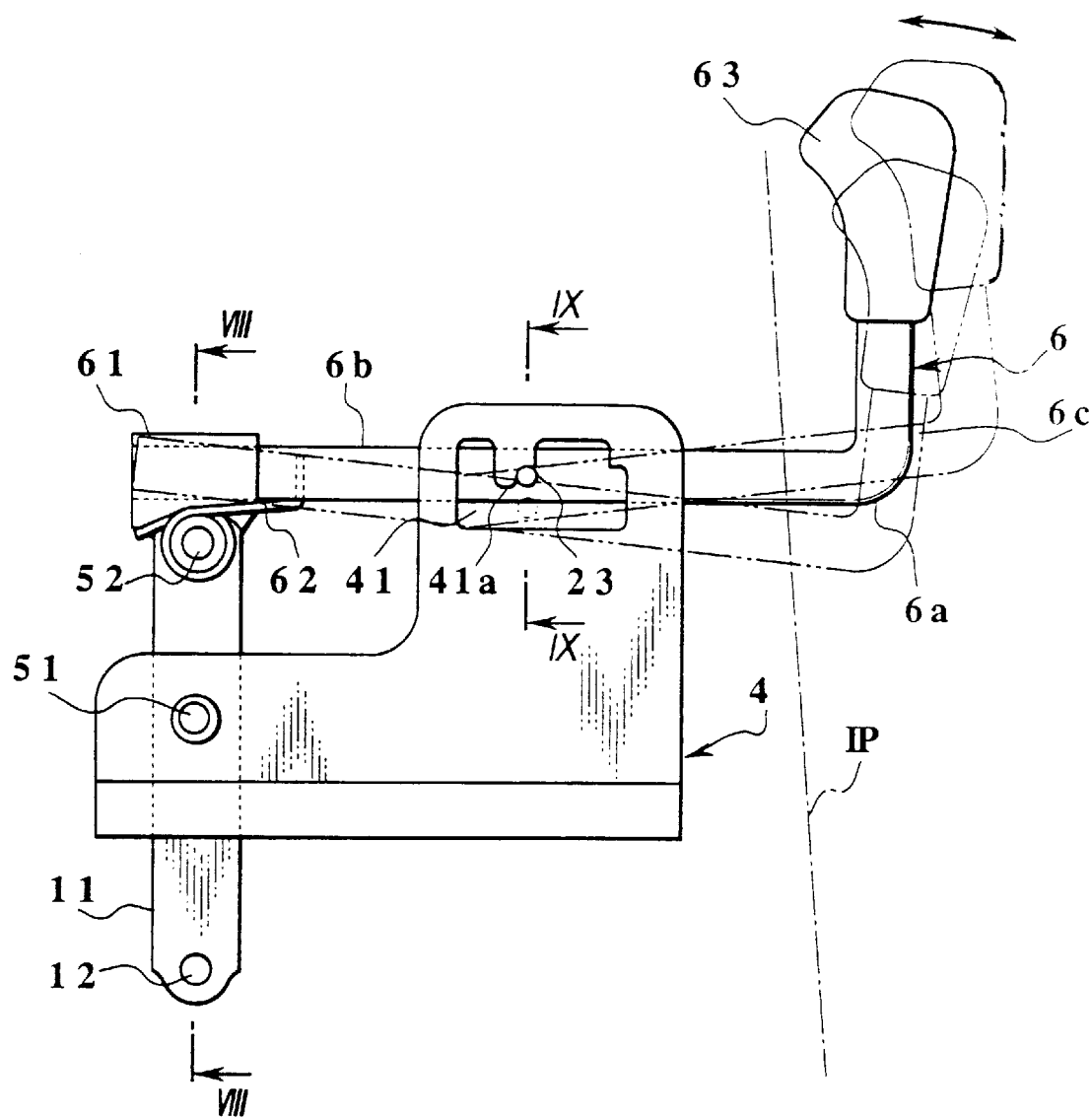
FIG. 7 is a side elevational view which shows an operating apparatus for an automatic transmission in accordance with a second embodiment of the present invention.
Figure 8:
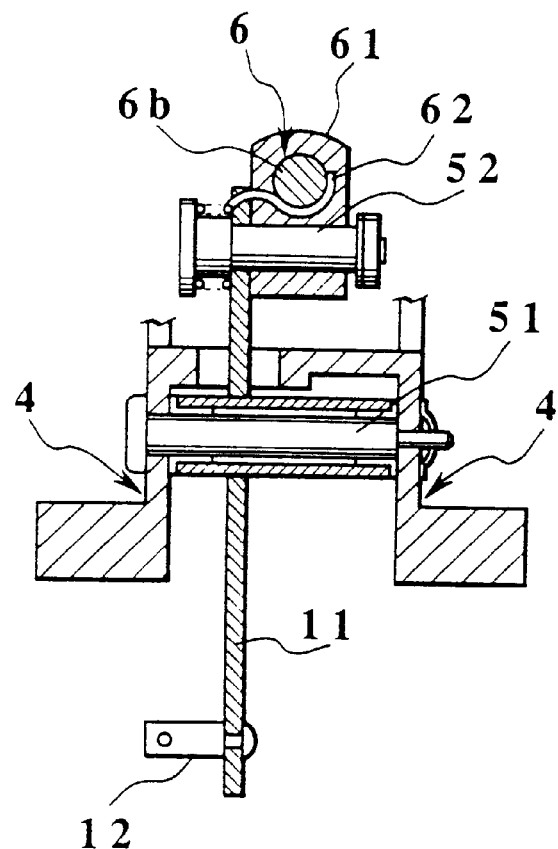
FIG. 8 is a cross sectional view along a line VIII—VIII in FIG. 7 which shows the operating apparatus of the automatic transmission.
Figure 9:
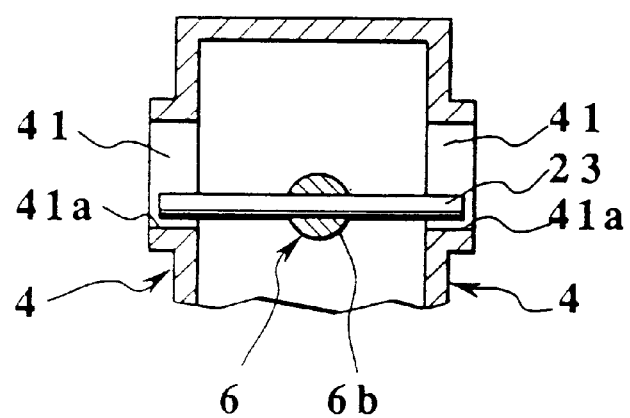
FIG. 9 is a cross sectional view along a line IX—IX in FIG. 7 which shows the operating apparatus of the automatic transmission.

Next, a second embodiment in accordance with the present invention will be described below with reference to FIGS. 7 to 9. The same reference numerals are attached to the same elements as those in the first embodiment and the explanation thereof will be omitted. The second embodiment is different from the first embodiment in view that the second pin 52 is positioned at the front end of the working portion 6b and the position pin 23 and the detent gate 41 are positioned at the middle portion of the working portion 6b. In the second embodiment, since the lower surface of the detent gate 41 is formed to be horizontal, when the operating lever 6 is moved toward the driver's seat DS, the operating lever 6 moves to a substantially horizontal direction.

In accordance with the operating apparatus for the automatic transmission, the same operation and effect as those in the first embodiment can be obtained.

Next, a third embodiment in accordance with the present invention will be described below with reference to FIGS. 10 to 11. The same reference numerals are attached to the same elements as those in the first embodiment and the explanation thereof will be omitted. The third embodiment is different from the first embodiment in view that the position pin 23 is removed from the engagement with the detent 41a by rotating the operating lever 6 around the axis thereof.

Accordingly, the operating portion 6c of the operating lever 6 is provided in a bearing member 64 fixed to the one end portion of the select lever 11 in such a manner as to freely rotate around the axis and to freely move to the axial direction. Further, the operating lever 6 is energized by a torsion spring (a biasing member) 65 in such a manner that the position pin 23 is brought into contact with the detent 41a.

Figure 10:
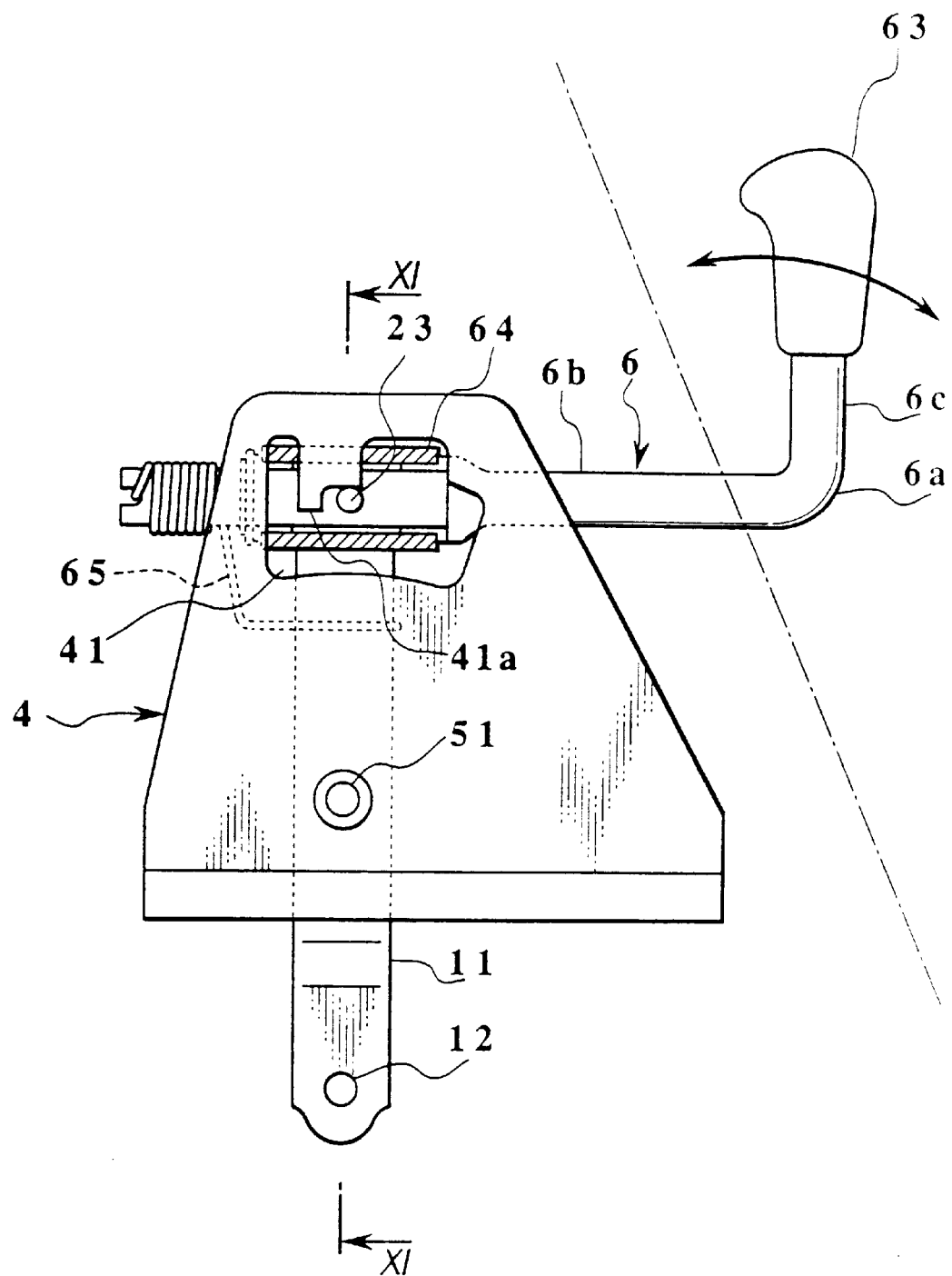
FIG. 10 is a side elevational view which shows an operating apparatus for an automatic transmission in accordance with a third embodiment of the present invention.
Figure 11:
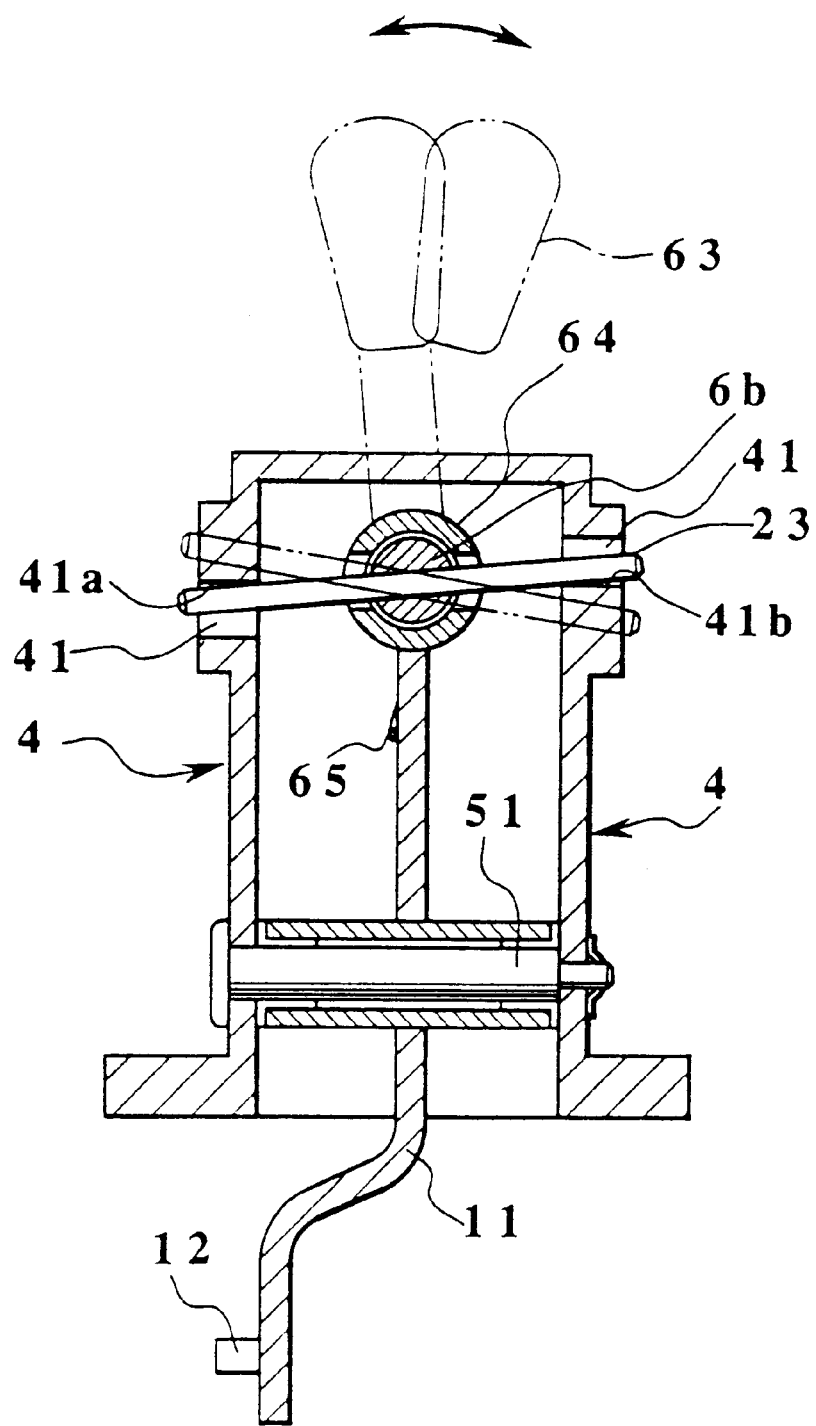
FIG. 11 is a cross sectional view along a line XI—XI in FIG. 10 which shows the operating apparatus of the automatic transmission.

In accordance with the third embodiment, as shown in FIG. 10, the operating lever 6 moves in such a manner as to always generate the arch like locus around the pin 51.

In accordance with the operating apparatus for the automatic transmission structured in the above manner, since the operating lever 6 is connected to the select lever 11 in a substantially perpendicular manner, the position pin 23 is rotatably provided around the axis of the operating lever 6, the freedom of layout for the operating lever 6, the position pin 23 and the detent gate 41 can be enlarged.

Further, the position pin 23 can be taken off from the recess portion of the detent 41*a* by rotating the operating lever 6 around the axis of the operating lever 6. Accordingly, in this case, since it is not necessary to use the knob button 66, position spring 27 and compression rod 22 shown in FIG. 16, reduction of the number of the parts, simplification of the structure and cost reduction thereby can be achieved.

Therefore, even in the case that the operating lever 6 is disposed in such a manner as to project from the vertical wall surface of the instrument panel IP of the automotive vehicle, the operating structure of the position pin 23 can be simplified and the cost can be reduced.

In the third embodiment, the bearing member 64 may be supported to the select lever 11 in such a manner as to freely rotate, as in the first embodiment mentioned above. In this case, it is necessary to provide a positioned member such as a pin in the working portion 6*b* of the operating lever 6 and to provide a positioning member such as a groove in which the positioned member is slid in the detent plate 4. Accordingly, in the third embodiment, the same operation effect as those in the first embodiment can be obtained.

Figure 12:
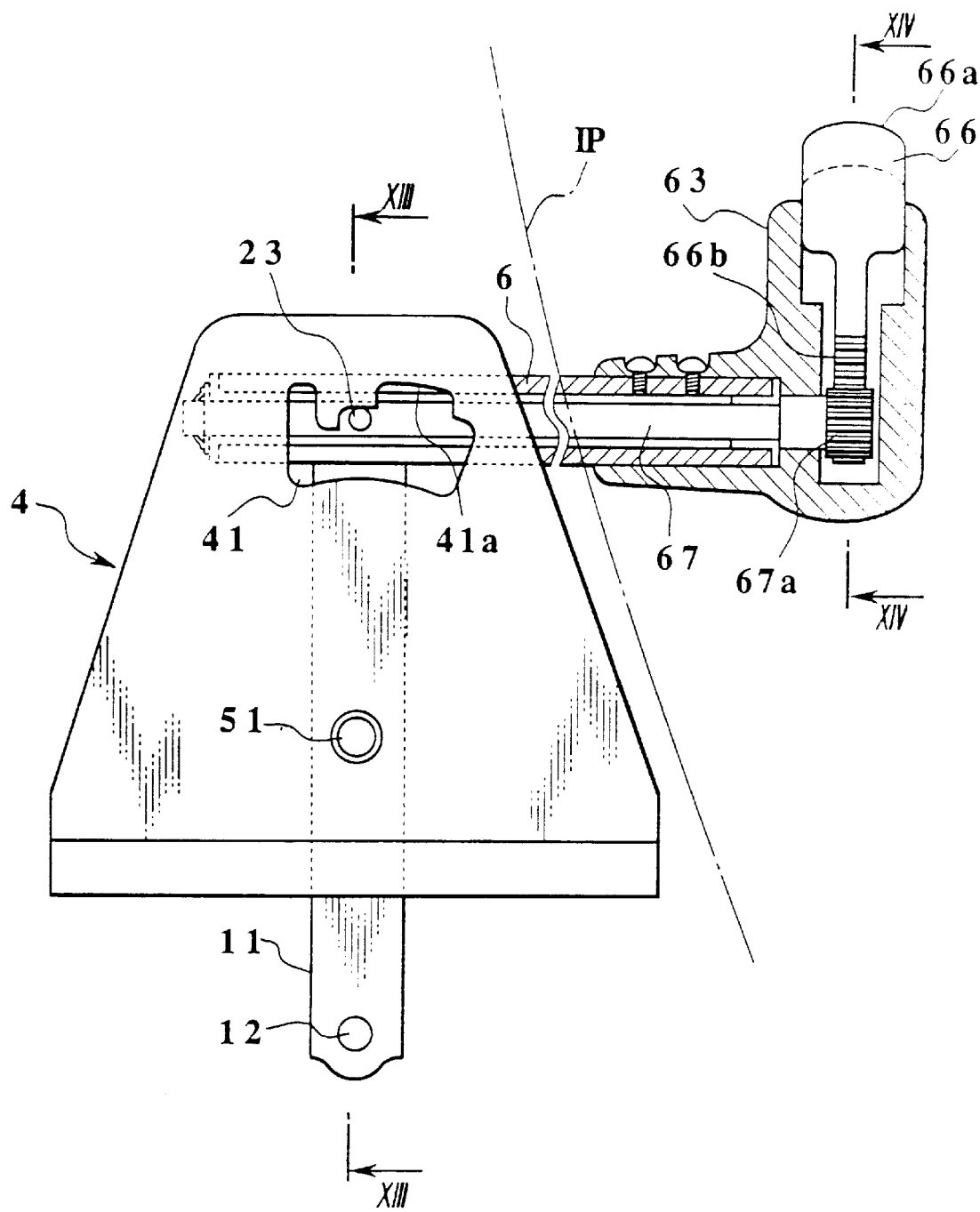
FIG. 12 is a side elevational view which shows an operating apparatus for an automatic transmission in accordance with a fourth embodiment of the present invention.
Figure 13:
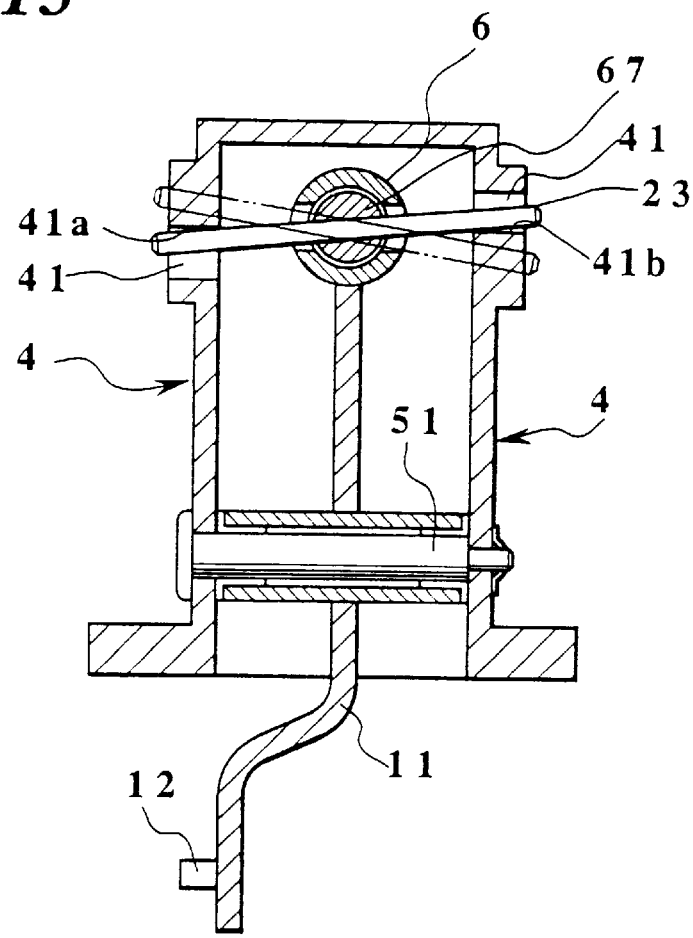
FIG. 13 is a cross sectional view along a line XIII—XIII in FIG. 12 which shows the operating apparatus of the automatic transmission.
Figure 14:
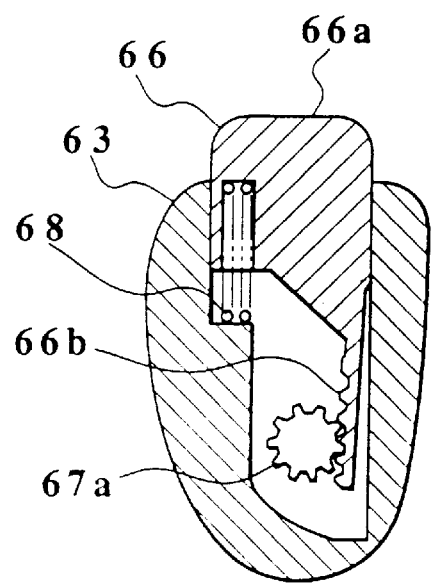
FIG. 14 is a cross sectional view along a line XIV—XIV in FIG. 12 which shows the operating apparatus of the automatic transmission.

Next, a fourth embodiment in accordance with the present invention will be described below with reference to FIGS. 12 to 14. The same reference numerals are attached to the same elements as those in the third embodiment and the explanation thereof will be omitted. The fourth embodiment is different from the third embodiment in view that the position pin 23 is removed from the engagement with the detent 41*a* by a knob button 66.

Accordingly, the operating lever 6 is constructed by a straight pipe having a circular cross section, and the operating knob 63 is provided on the one end portion thereof. Further, the outer peripheral portion of the operating lever 6 is fixed to the one end portion of the select lever 11 in a substantially perpendicular manner, and a rotating rod 67 is rotatably provided within the operating lever 6.

The position pin 23 is provided at the position corresponding to the detent 41*a* in the rotating rod 67. Further, the one end portion of the rotating rod 67 projects into the operating knob 63 and a pinion gear 67*a* is formed on an outer periphery of an end portion thereof.

The knob button 66 is provided in the operating knob 63 in such a manner as to freely go forward and backward in a state that an operating surface 66*a* of the one end is exposed from the operating knob 63. Then, a rack gear 66*b* meshed with the pinion gear 67*a* is formed on the other end portion of the knob button 66. Further, a return spring 68 for returning the operating knob 63 to the original position projecting from the operating knob 63 is provided in the operating knob 63. Then, the position pin 23 is energized by a resilient force of the return spring 68 in such a manner as to be brought into contact with the detent 41*a*.

In accordance with the operating apparatus for the automatic transmission structured above, the rotating rod 67 is rotated by pushing the knob button 66, so that the position pin 23 can be taken off from the recess portion of the detent 41*a*. In the fourth embodiment, the same operation and effect as those in the third embodiment can be obtained.

In the above embodiments, the operating apparatus for the automatic transmission is provided in the instrument panel IP of the automotive vehicle, however, the operating apparatus may be provided in the other panels in front of the driver's seat DS or the other parts. Further, the operating apparatus for the automatic transmission may be provided in a floor portion In front of the driver's seat DS.

Next, a fifth embodiment in accordance with the present invention will be described below with reference to FIG. 15. The same reference numerals are attached to the same elements as those in the first to fourth embodiments and the explanation thereof will be omitted. The operating apparatus for the automatic transmission shown in this embodiment comprises, as shown in FIG. 15, the detent plate 4 having the detent 41*a* formed to have an uneven shape, a rotating pin (a rotation supporting point) 151 provided in the detent plate 4, the select lever 11 rotatably provided in the detent plate 4 through the rotating pin 151 and connected to the automatic transmission (not shown)end, the operating lever 6 connected to the select lever 11 and rotating around the rotating pin 151 together with the select lever 11, and the locking member (not shown) provided in the operating lever 6 and inhibiting the motion of the operating lever 6 and removing the inhibition by engaging with the recess portion of the detent 41*a* or removing from the recess portion.

The detent 41*a* is provided at a position of the detent plate 4 which is opposite to the operating lever 6 with respect to the rotating pin 151. Then, the detent 41*a* is provided on the upper end surface of the detent gate 41 open to the side wall surface of the detent plate 4 in such a manner as to form an uneven shape.

Further, the detent plate 4 is structured such that two plates are provided in parallel, and the operating lever 6 and the select lever 11 are disposed between these detent plates 4. Then, the rotating pin 151 is provided in such a manner as to extend between two detent plates 4.

Figure 15:
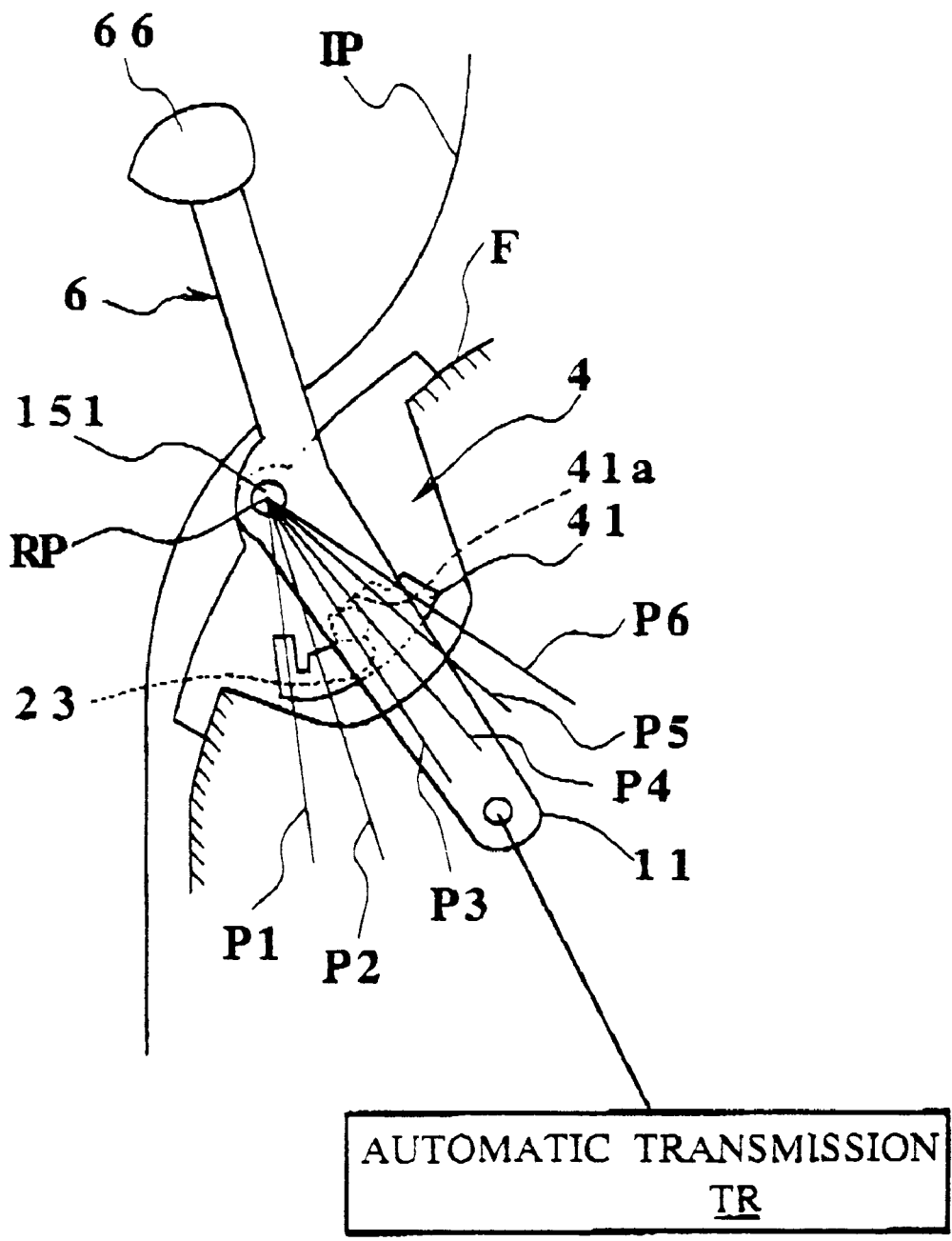
FIG. 15 is a side elevational view which shows an operating apparatus for an automatic transmission in accordance with a fifth embodiment of the present invention.

The operating apparatus for the automatic transmission structured above is fixed to a frame F within the instrument panel IP of the automotive vehicle, as shown in FIG. 15, and the operating lever 6 projects from the instrument panel IP to the driver's seat to be positioned in the side of the steering wheel. Further, the detent gate 41 of the detent plate 4 is disposed inside (downward) the mounting surface of the frame F, thereby reducing the projection of the detent plate 4 with respect to the mounting surface of the frame F.

Then, in the operating apparatus for the automatic transmission mentioned above, since the detent 41*a* is provided in the side opposite to the operating lever 6, the length of the operating lever 6 can be reduced. Accordingly, the operating apparatus can satisfy the structure in which the length of the operating lever 6 should be reduced. Therefore, the operating apparatus is effective in view of improving the operating performance such that the operating lever 6 is mounted in an optimum position in the side of the steering wheel.

Further, since the length of the operating lever 6 can be reduced, the operating stroke of the operating lever 6 can be shortened.

Still further, since the detent 41*a* is disposed below the rotating pin 151 of the operating lever 6 and the detent plate 4 does not project from the instrument panel IP to the operating lever 6, the construction in the periphery of the operating lever 6 becomes neat and the mounting space for mounting the operating apparatus for the automatic transmission can be reduced. Accordingly, the mounting space can be made compact. Further, since the detent plate 4 is prevented from projecting from the instrument panel IP, the space within the cabin can be widely used, the operating apparatus does not disturb the driver moving to the assistant driver's seat or the rear seat, and it is effective in view of employing the walk-in-through mechanism.

Next, a sixth embodiment in accordance with the present invention will be described below with reference to FIGS. 16 to 19. The same reference numerals are attached to the same elements as those in the fifth embodiment and the explanation thereof will be omitted.

The operating lever 6 in accordance with the sixth embodiment comprises a pipe formed as a straight shape and the operating knob 63 provided in the head portion of the pipe 21. A compression rod 22 is provided within the pipe 21 in such a manner as to freely slide in the axial direction, and the position pin 23 is provided in the front end of the compression rod 22. The position pin 23 is detachably disposed in the detent 41a with the front end portion being inserted into the detent gate 41. The knob button 66 for pressing the compression rod 22 downward and the return spring (not shown) for returning the knob button 66 to the original position are provided in the operating knob 63. Further, a position spring 27 for ascending the compression rod 22 upward so as to bring the position pin 23 into contact with the detent 41a is provided within the pipe 21.

Then, a locking member R for inhibiting the motion of the operating lever 6 and removing the inhibition is constituted by the compression rod 22, the position pin 23, the knob button 66, the return spring and the position spring 27.

Further, the operating lever 6 is connected to the select lever 11 at a position in which the pipe 21 thereof is shifted at a predetermined distance (a distance C in FIG. 16) with respect to the rotating center of the rotating pin 151. Accordingly, by providing the operating lever 6 in a shifted manner, the locking member R can be operated against the detent 41a disposed in a position opposite to the operating lever 6 with respect to the rotating in 151 without being disturbed by the rotating pin 151.

Still further, the operating lever 6 is provided with an indicator plate 102 moving together with the operating lever 6. The indicator plate 102 extends upward along the inner surface of the instrument panel IP, is slidably provided in the instrument panel IP, and a mark 102a, for example, colored in red is provided on the surface thereof.

Then, an indicator 101 displaying a position of the operating lever 6 in accordance with the position of the indicator plate 102 is provided on the surface of the instrument panel IP along the moving line of the indicator plate 102. The indicator 101 comprises symbols 101a showing the parking position P, the neutral position N and the like, and a indicator window 101b disposed adjacent the respective symbols 101a and through which the color of the mark 102a of the indicator 102 can be observed.

Figure 16:
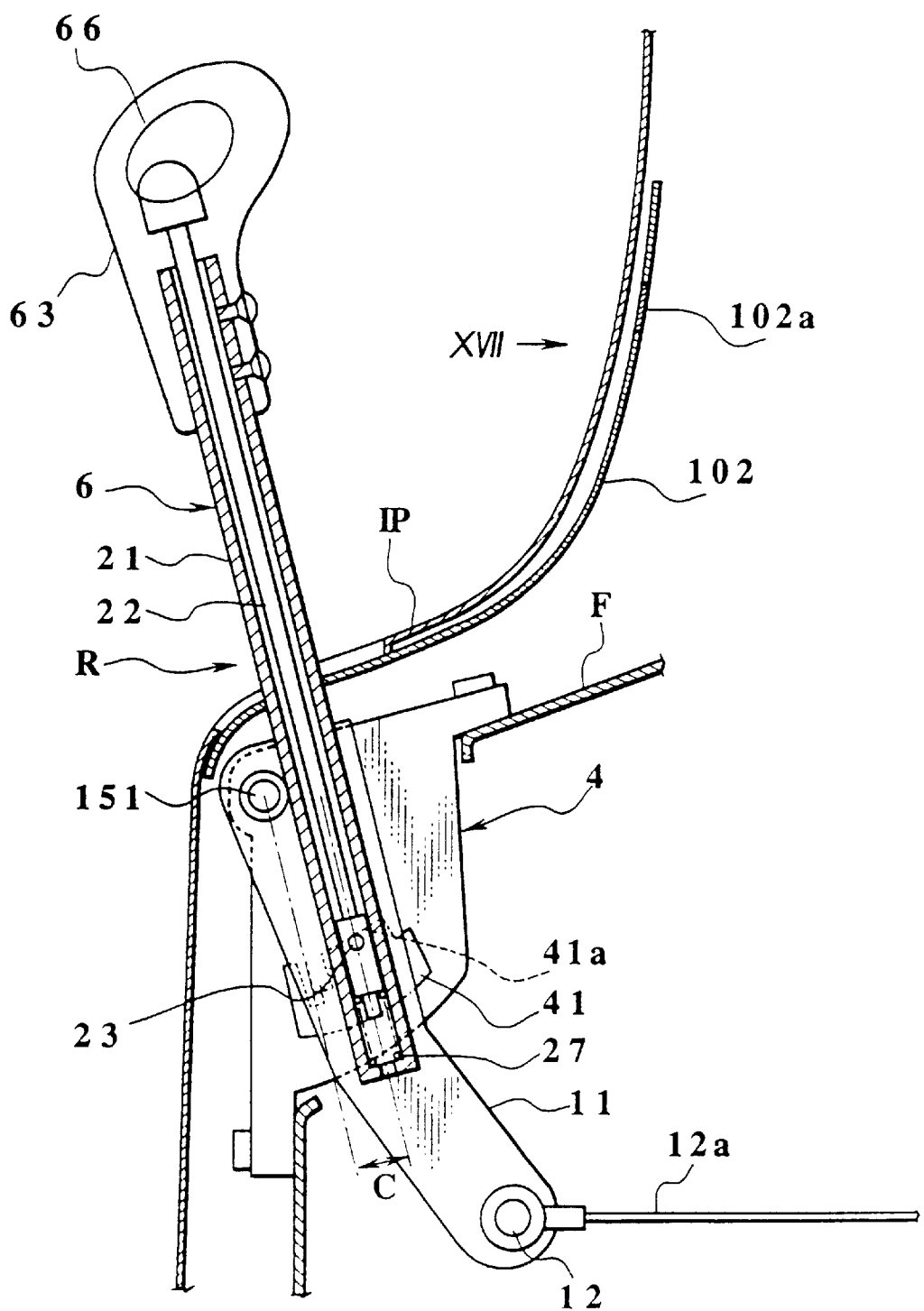
FIG. 16 is a side elevational view which shows an operating apparatus for an automatic transmission in accordance with a sixth embodiment of the present invention.
Figure 17:
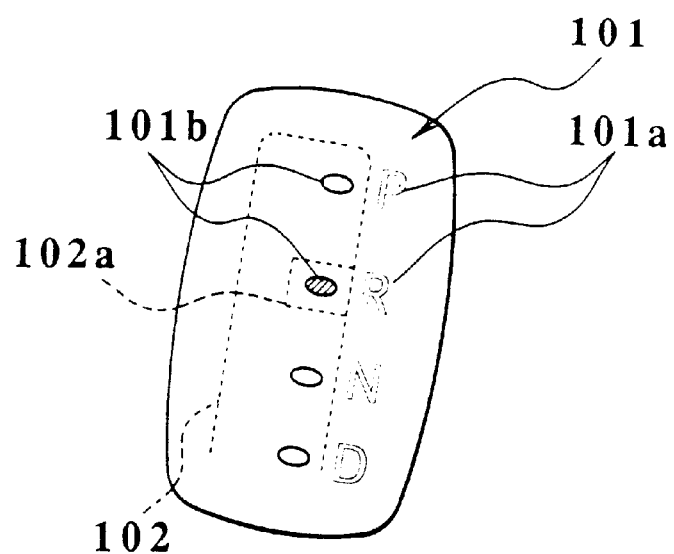
FIG. 17 is a view as seen from an arrow XVII in FIG. 16.
Figure 18:
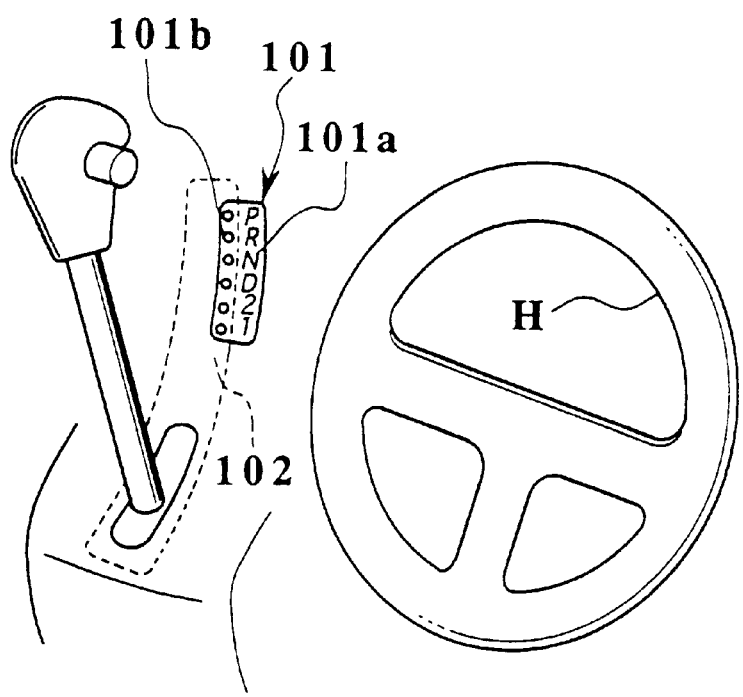
FIG. 18 is a perspective view of the operating apparatus for the automatic transmission.
Figure 19:
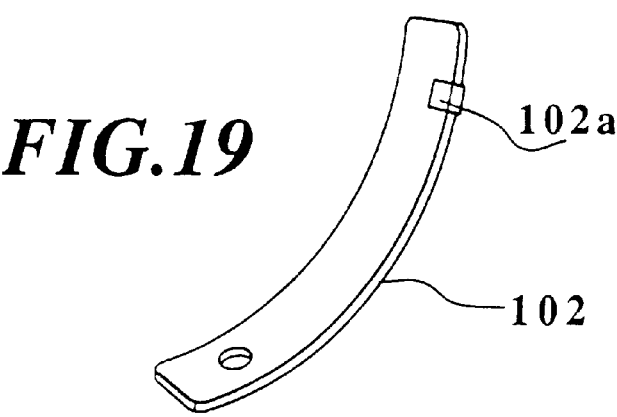
FIG. 19 is a perspective view which shows an indicator plate of the operating apparatus for the automatic transmission.

Further, in FIG. 16, reference numeral 12a denotes a select cable extending from the select lever 11 to the automatic transmission end (not shown).

In the operating apparatus for the automatic transmission structured in the above manner, since the pipe 21 of the operating lever 6 is provided at a position which is shifted at a predetermined distance with respect to the rotating center of the rotating pin 151, the locking member R for attaching and detaching to the recess portion of the detent 41a can be easily provided along the operating lever 6 without being disturbed by the rotating pin 151.

Still further, since the position of the operating lever 6 can be observed by the position of the indicator plate 102 moving together with the operating lever 6, the vacant space above the instrument panel IP can be efficiently utilized.

When the indicator is set, for example, immediately in the side of the operating lever 6, there is a risk of hardly observing the indicator by the steering wheel H (refer to FIG. 18), the wiper switch and the like. However, by providing the indicator 101 above the operating lever 6, visibility of the indicator 101 can be improved. Accordingly, the indicator 101 can be disposed at a position in which the driver can easily observe.

In the above embodiments, the indicator plate 102 is provided in such a manner as to extend upward, however, it may be provided in such a manner as to extend downward. In this case, the indicator 101 is disposed below the operating lever 6.

Figure 20:
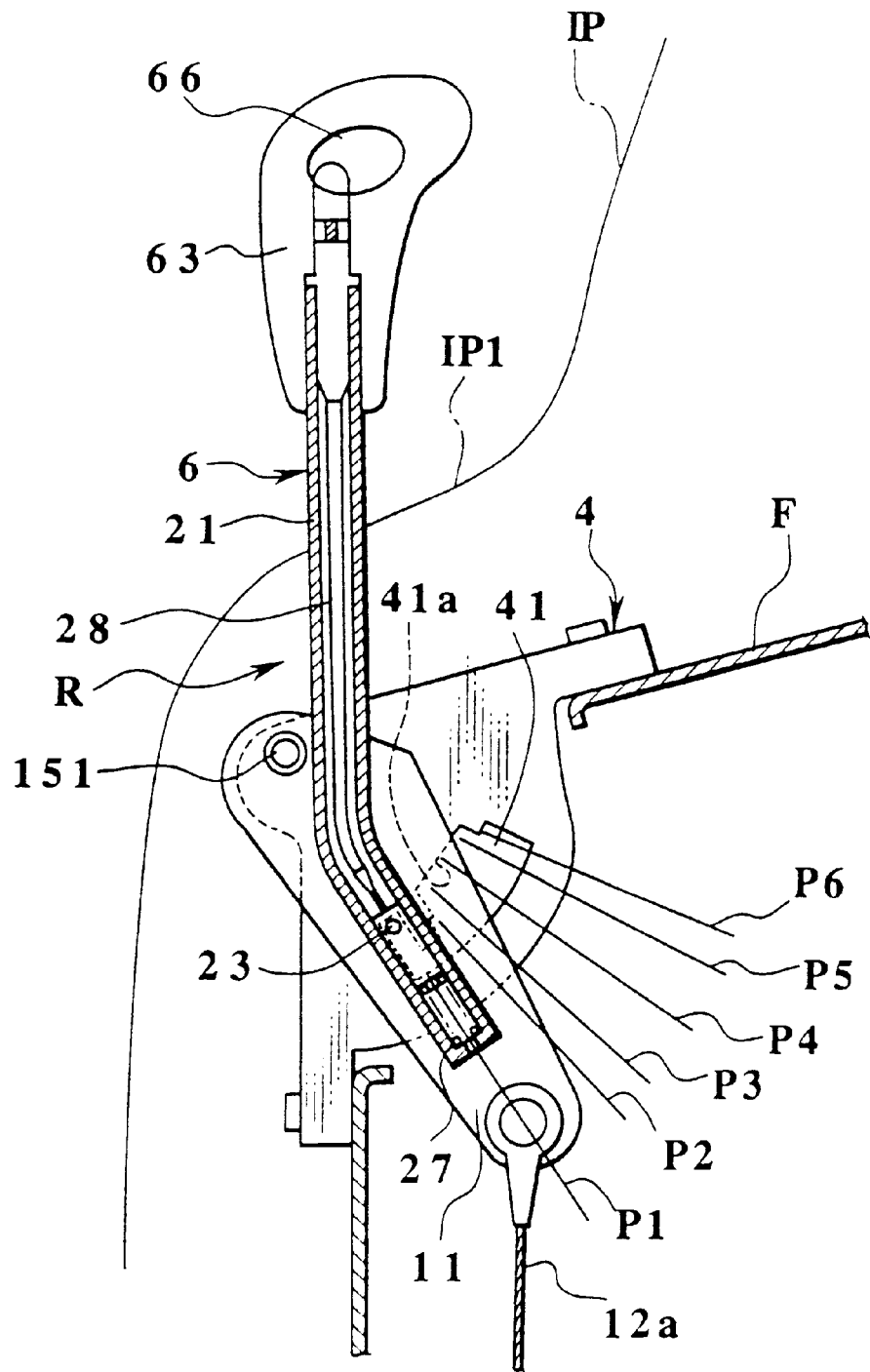
FIG. 20 is a side elevational view which shows an operating apparatus for an automatic transmission in accordance with a seventh embodiment of the present invention.

Next, a seventh embodiment in accordance with the present invention will be described below with reference to FIG. 20. The same reference numerals are attached to the same elements as those in the sixth embodiment and the explanation thereof will be omitted. The seventh embodiment is different from the sixth embodiment in view that the pipe 21 of the operating lever 6 is formed by bending.

Accordingly, the operating lever 6 is formed by bending the pipe 21 in such a manner as to be housed in the space portion above a shelf portion IP1 formed on the instrument panel IP. Therefore, a bendable compression cable 28 is provided within the pipe 21 in place of the compression rod 22.

In the operating apparatus for the automatic transmission structured above, since the operating lever 6 is housed in the space portion above the shelf portion IP1 of the instrument panel IP, the space within the cabin can be effectively utilized. Further, since the pipe 21 can be bent in a free direction by using the compression cable 28, the operating performance of the operating lever 6 can be improved.

Figure 21:
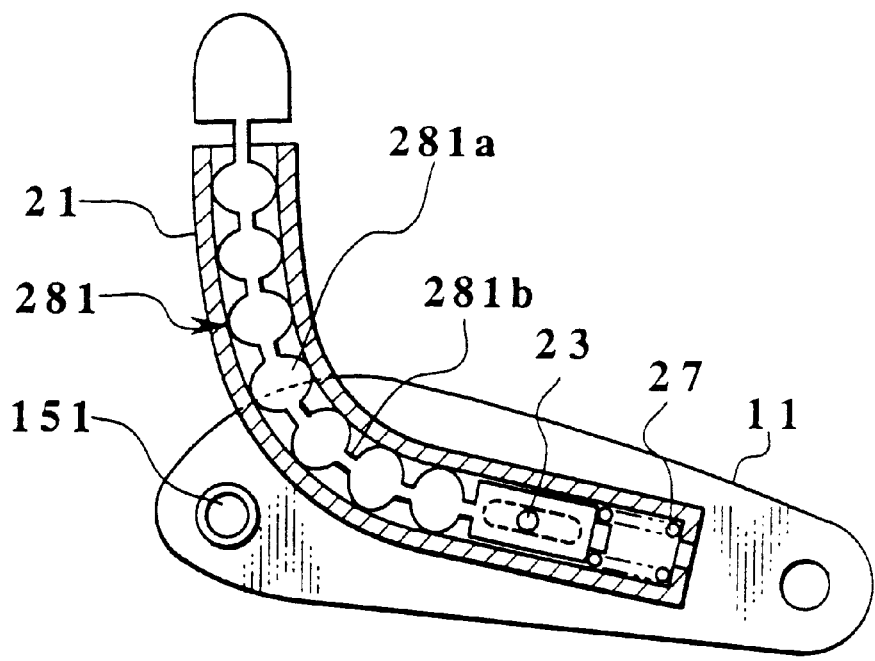
FIG. 21 is a schematic view which shows another embodiment of a compression cable in the operating apparatus for the automatic transmission.

In this case, a flexible rod 281 shown in FIG. 21 may be provided in place of the compression cable 28 mentioned above. The flexible rod 281 is formed by a resin material and is structured such that an expansion portion 281a having a spherical surface is slidably fitted to the inner surface of the pipe 21 and a small diameter portion 281b is bent. In the case of using the flexible rod 281, a vibration sound due to interference between the flexible rod 281 and the inner surface of the pipe 21 can be prevented.

Figure 22:
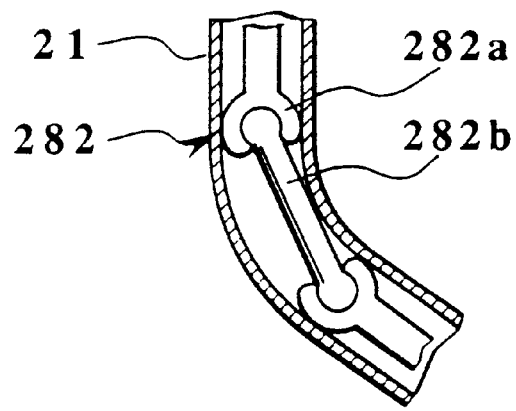
FIG. 22 is a schematic view which shows a further embodiment of a compression cable in the operating apparatus for the automatic transmission.

Further, a joint type rod 282 shown in FIG. 22 may be provided in place of the compression cable 28 mentioned above. The rod 282 is constituted by a female joint 282a and a male joint 282b in such a manner as to be freely bent. An expansion portion having a spherical surface of the female joint 282a is structured to be slidably fitted into the inner surface of the pipe 21.

Figure 23:
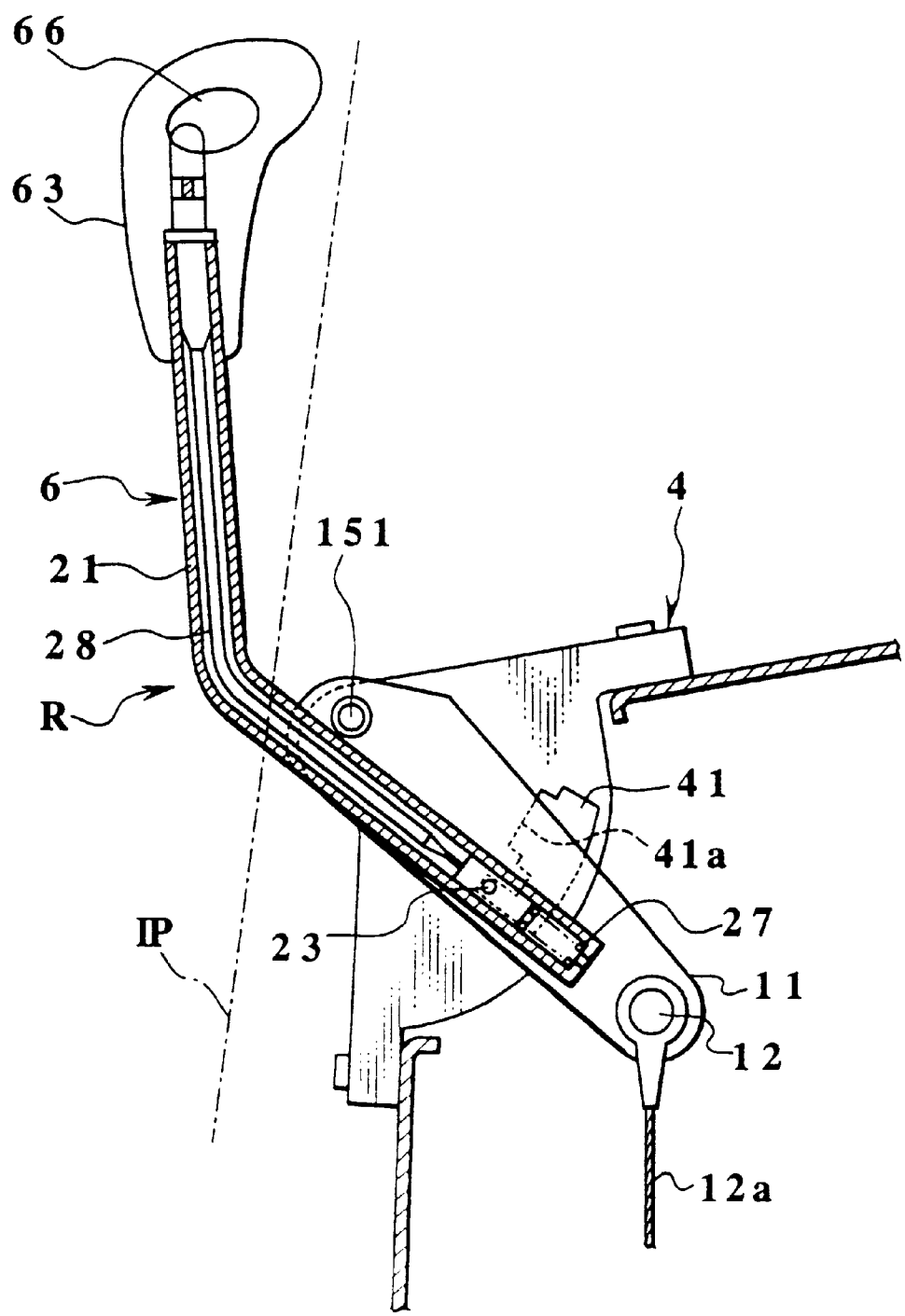
FIG. 23 is a side elevational view which shows an operating apparatus for an automatic transmission in accordance with a eighth embodiment of the present invention.

Next, an eighth embodiment in accordance with the present invention will be described below with reference to FIG. 23. The same reference numerals are attached to the same elements as those in the seventh embodiment and the explanation thereof will be omitted. The eighth embodiment is different from the seventh embodiment in view that the instrument panel IP is formed as a substantially vertical shape, the pipe 21 of the operating lever 6 is bent in such a manner as to project from the instrument panel IP and extend along the surface of the instrument panel IP.

In the operating apparatus for the automatic transmission structured in the above manner, the space within the cabin can be effectively utilized without being limited by the mounting position.

While preferred embodiments of the present invention have been described using specific terms, such description is for illustrative purposes, and it is to be understood that changes and variations may be made without departing from the spirit or scope of the following claims.

What is claimed is:

1. An operating apparatus for an automatic transmission, comprising:

a detent plate (4) having a plurality of detents formed as an uneven shape;

a first rotation supporting point (51) provided on the detent plate (4);

a select lever (11) rotatably provided on the detent plate (4) through the first rotation supporting point (51);

an operating lever (6) comprising an operating portion (6c) and a working portion (6b), the operating lever (6) being supported by an upper portion of the select lever (11) such that the working portion (6b) is perpendicular to the upper portion of the select lever (11); and a position member (23) provided on the working portion (6b) of the operating lever (6), the position member (23) selectively engaging with a recess portion of the detent plate (4), wherein the operating apparatus is disposed in an instrument panel (IP) located in front of a driver's seat (DS); and wherein the working portion (6b) projects through and from the instrument panel (IP) toward the driver's seat (DS), thereby locating the operating portion (6c) out of the instrument panel (IP).

2. An operating apparatus for an automatic transmission according to claim 1, wherein the operating lever (6) is rotatably supported by the upper end of the select lever (11) by means of a second rotation supporting point (52).

3. An operating apparatus for an automatic transmission according to claim 1, wherein The position member (23) is located on an end portion of the working portion (6b).

4. An operating apparatus for an automatic transmission according to claim 1, wherein the position member (23) is located on a middle portion of the working portion (6b); and the plurality of detents formed on the detent plate (4) are located on the middle portion of the working portion (6b).

5. An operating apparatus for an automatic transmission according to claim 1, wherein the working portion (6b) of the operating lever (6) is structured so as to rotate around an axis of the working portion (6b) so that the position member (23) is selectively engaged and disengaged with a recess portion of the detent plate (4).

6. An operating apparatus for an automatic transmission according to claim 5, wherein the working portion (6b) of the operating lever (6) is rotated around the axis of the working portion (6b) by a knob button (63) provided on the operating portion (6c) of the operating lever (6).

* * * * *